DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 8

T938,009

BELT STRUCTURE FOR A PNEUMATIC TIRE

James T. Weissert, 4417 Colony Hills Drive, Akron, Ohio 44313, and David M. Ronyak, 1490 Sunnyacres Road, Copley, Ohio 44321

Filed July 12, 1974, Ser. No. 488,609

**Int. Cl. B60c *9/18***

U.S. Cl. 152—361 FP

1 Sheet Drawing. 9 Pages Specification

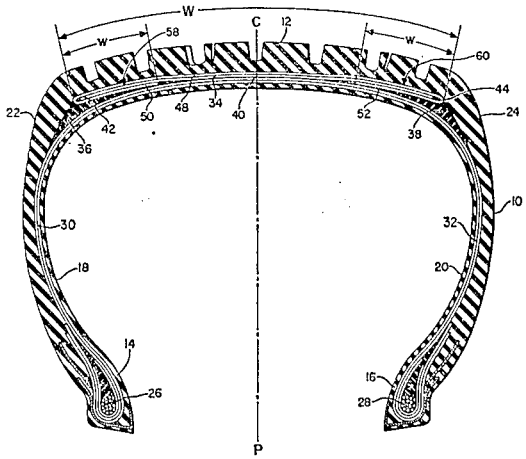

A pneumatic tire provided with a folded belt structure, including two plies of tire cord fabric, the cords of each ply being composed of organic fibers and having a modulus of elasticity of at least 300 grams per denier. The axially outer edges of one ply are reversely folded back over the respectively adjacent axially outer edges of the other ply.

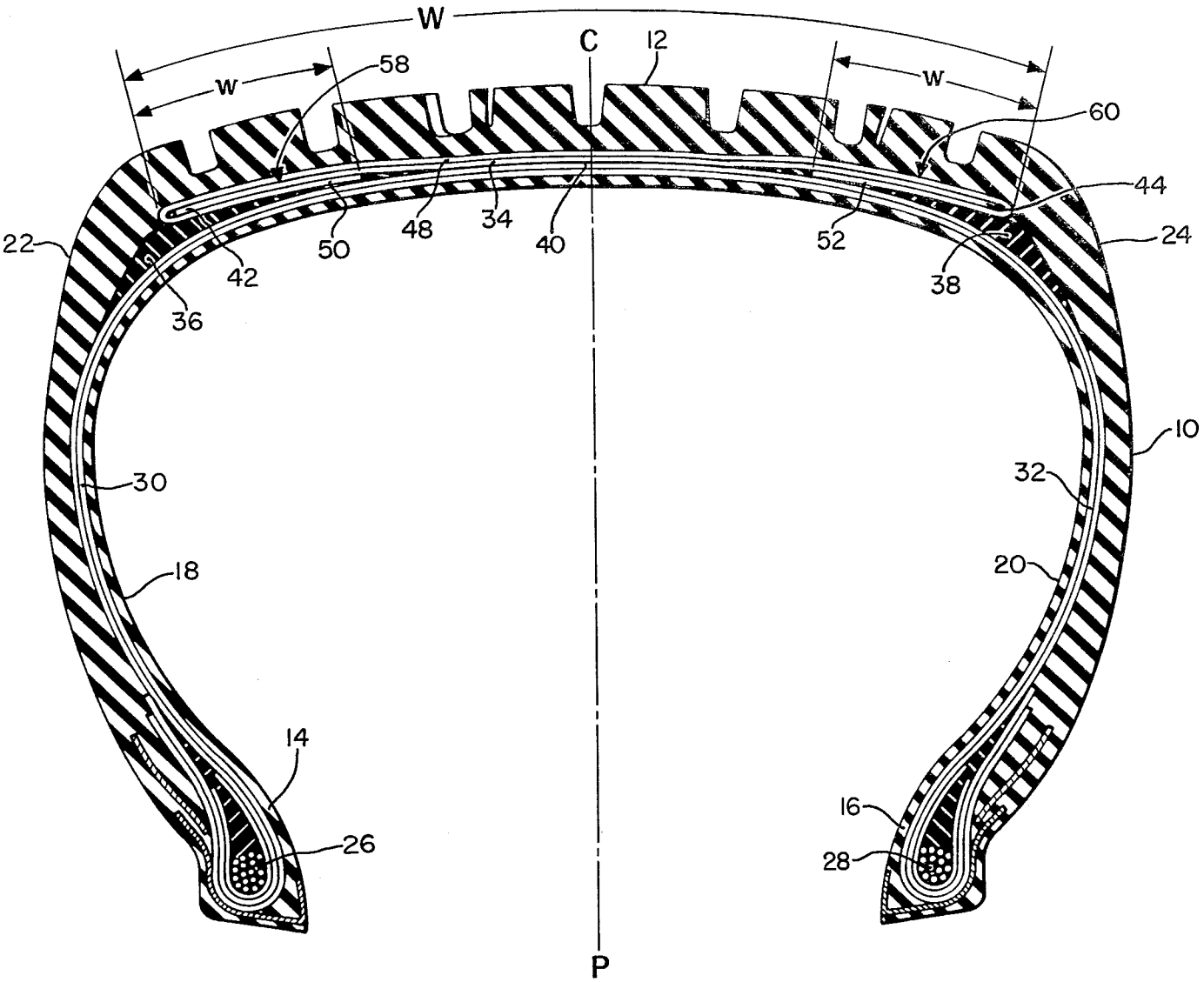

BELT STRUCTURE FOR A PNEUMATIC TIRE
Filed July 12, 1974